(12) United States Patent
Turner (10) Patent No.: US 7,004,064 B1
(45) Date of Patent: Feb. 28, 2006

(54) COOKING APPARATUS FOR BACON STRIPS

(76) Inventor: Steven William Turner, 9 Runyan Pl., Chester, NJ (US) 07930

( * ) Notice: Subject to any disclaimer, the term of this patent is extended or adjusted under 35 U.S.C. 154(b) by 204 days.

(21) Appl. No.: 10/617,953

(22) Filed: Jul. 14, 2003

(51) Int. Cl.
*A47J 37/04* (2006.01)
(52) U.S. Cl. .............................. 99/446; 99/448; 99/449
(58) Field of Classification Search .......... 99/DIG. 14, 99/444, 445, 446, 425, 448, 449, 421 V
See application file for complete search history.

(56) References Cited

U.S. PATENT DOCUMENTS

| | | | |
|---|---|---|---|
| 3,640,209 A | * | 2/1972 | Wilson .......................... 99/446 |
| 4,074,102 A | * | 2/1978 | Asen ............................ 219/732 |
| 4,112,833 A | | 9/1978 | Oda et al. |
| 4,933,528 A | | 6/1990 | Barr |
| 4,950,524 A | * | 8/1990 | Hacker ........................ 428/163 |
| 4,952,764 A | * | 8/1990 | Harrington ................... 219/732 |
| D318,206 S | | 7/1991 | Watznauer |
| 5,151,568 A | | 9/1992 | Rippley |
| 5,650,085 A | | 7/1997 | Chen |
| 5,714,740 A | | 2/1998 | Kelly et al. |

* cited by examiner

*Primary Examiner*—Reginald L. Alexander (57) ABSTRACT

An apparatus for cooking bacon includes a base having a bottom surface and a plurality of edge portions integral therewith and extending upwardly therefrom. A plurality of elongate prongs have lower end portions integral with the rack and extend upwardly therefrom, respectively. A plurality of lips integral with the plurality of prongs and extending upwardly from the lower end portions thereof, respectively, receive bacon strips therealong. The plurality of prongs are generally equally spaced apart for allowing a plurality of bacon strips, each having opposed side edge portions, to be corrugated therebetween. Advantageously, such bacon strips remain detached from each other and are maintained on substantially one respective side edge portion during a cooking process to thereby allow grease to drip downwardly therefrom and towards the base.

16 Claims, 8 Drawing Sheets

COOKING APPARATUS FOR BACON STRIPS

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a cooking apparatus and, more particularly, to an apparatus for cooking bacon strips and including a disposable rack for receiving such strips and for maintaining same at a substantially corrugated pattern during the cooking process.

2. Prior Art

Microwave ovens are useful for, among other things, cooking small amounts of food quickly. A microwave oven has a cavity therein, with a tray or a shelf for placing food thereon. The oven has a door for allowing access to the interior.

When the oven is in use, the cavity is irradiated by electromagnetic energy. As the food is irradiated, it heats up and splatters if not covered. Splattering is particularly a problem with greasy foods such as bacon. In addition to splattering, bacon produces large amounts of hot grease that pools around the bacon. In order to prevent the bacon from "swimming" in the hot grease, one prior art method of cooking bacon utilizes sheets of paper towel located above and below the bacon. The paper towel absorbs the grease from the bacon. After cooking, the grease-sodden paper towel must be disposed of. This poses some degree of danger because the hot grease is exposed to the touch, wherein a cook handling the plate and paper towel can be easily burned. In addition, this prior art method is messy because the plate must be cleaned of grease after using.

Furthermore, as strips of bacon are cooked, the bacon has a tendency to shrink in size, to curl and to soak up a considerable amount of the grease in which it is being cooked and which is produced by the bacon itself during cooking. Additionally, if several pieces of bacon are cooked together, there is a tendency for the pieces to cling together if not kept separate. The use of microwave ovens has considerably decreased the amount of time needed to cook food such as bacon, but has done little to overcome the problems of shrinkage, curling and sticking together.

Cooking racks or trays such as those disclosed in U.S. Pat. Nos. 4,933,528 and 4,650,085 to Barr and Chen, respectively, disclose the concept of separating items of food during the cooking or cooling of the items. However, these conventional racks do not address the problems of shrinkage or absorption of grease.

Accordingly, there remains a need to provide a cooking apparatus including a disposable rack for receiving such bacon strips and for maintaining same at a substantially corrugated pattern during the cooking process.

BRIEF SUMMARY OF THE INVENTION

In view of the foregoing background, it is therefore an object of the present invention to provide a disposable rack for efficiently cooking bacon strips so that grease does not splatter about. These and other objects, features, and advantages of the invention are provided by an apparatus for cooking bacon including a base having a bottom surface and a plurality of edge portions integral therewith and extending upwardly therefrom. A plurality of elongate prongs has lower end portions integral with the rack and extend upwardly therefrom respectively. The plurality of prongs are generally equally spaced apart for allowing a plurality of bacon strips, each having opposed side edge portions, to be corrugated therebetween. Advantageously, such bacon strips remain detached from each other and are maintained on substantially one respective side edge portion during a cooking process to thereby allow grease to drip downwardly therefrom and towards the tray.

The apparatus further includes a plurality of lips integral with the plurality of prongs and extending upwardly from the lower end portions thereof respectively. Each of the plurality of lips receive one side edge portion of a bacon strip and help maintain same above the base and away from grease collected thereat. The apparatus may further include a plurality of depressions formed on the base and spaced apart between the plurality of edge portions. The plurality of depressions assist to absorb grease and maintain same in a predetermined area. Accordingly, the apparatus is preferably formed from grease-absorbing material.

The base may include a bottom surface coated with a grease-proof material for preventing grease from passes therethrough. The plurality of prongs are provided with a hollow interior so that a plurality of the apparatus can be stacked on top of each other.

In an alternate embodiment, the apparatus preferably includes a tray that has a substantially planar bottom surface and a plurality of edge portions integral therewith and extending upwardly therefrom. The apparatus further includes a rack removably positionable on top of the tray and between the plurality of edge portions. The rack may be formed from a disposable material or a plastic material.

The rack includes a plurality of elongate prongs having lower end portions connected to the rack and extending upwardly therefrom respectively. The plurality of prongs are generally equally spaced apart for allowing a plurality of bacon strips, each having opposed side edge portions, to be corrugated therebetween and detached from each other. Advantageously, the plurality of bacon strips are preferably maintained on substantially one respective side edge portion during a cooking process to thereby allow grease to drip downwardly therefrom and towards the tray.

The apparatus may further include a paper layer removably positionable between the bottom surface of the tray and the rack and for absorbing bacon grease. The plurality of prongs further has respective upper end portions that are preferably narrower than their respective lower end portions. Each respective upper end portion may be spaced further apart from each other than their respective lower end portions. Each prong further has a centrally disposed longitudinal axis preferably positioned at a non-perpendicular angle to the tray. The plurality of prongs may further have a substantially conical shape. The plurality of prongs further have an outer surface preferably converging upwardly from respective lower end portions thereof.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout, and prime and double prime notations are used to indicate similar elements in alternate embodiments.

Figure 1:
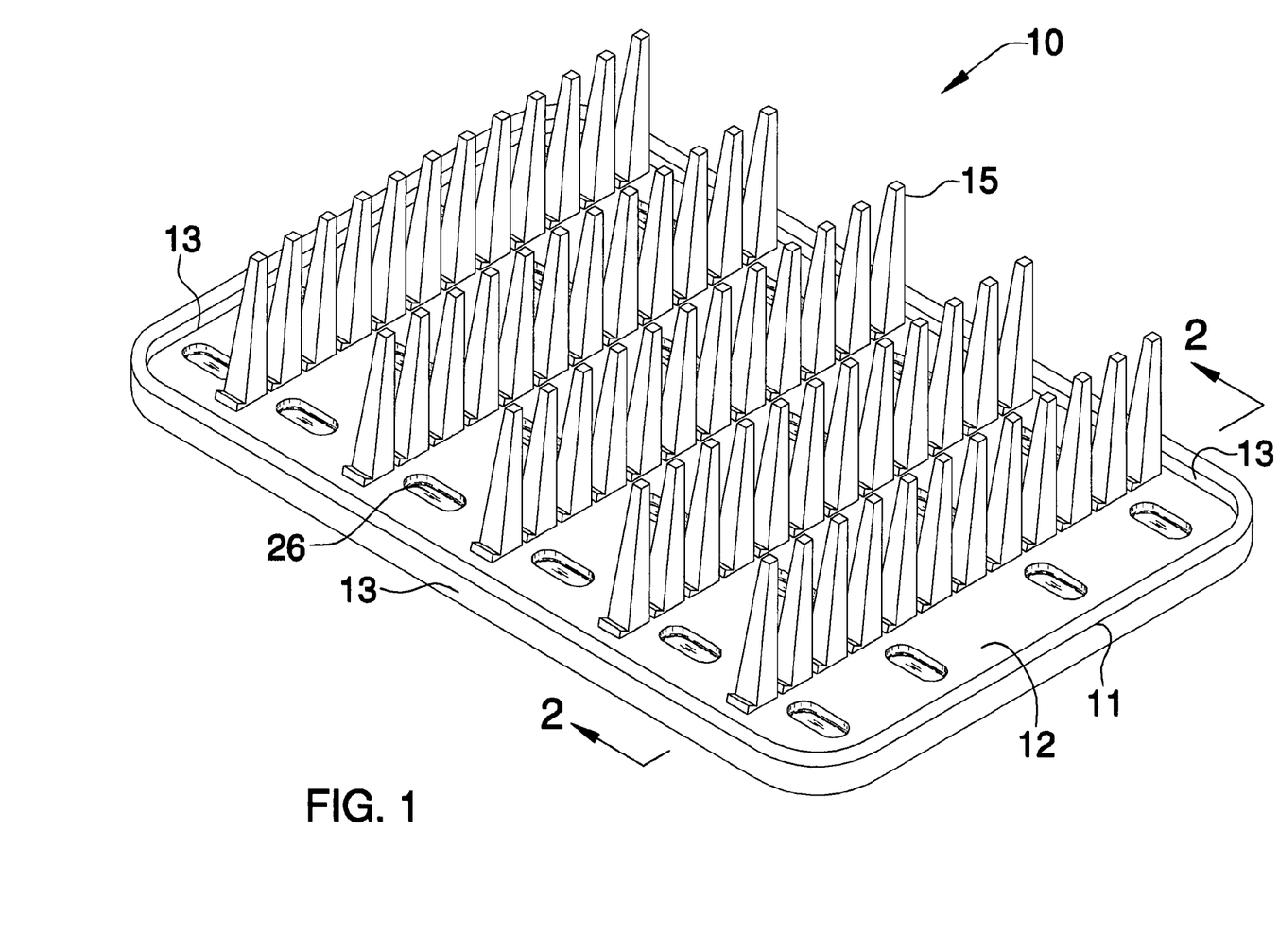
FIG. 1 is a perspective view of a cooking apparatus for receiving bacon strips and maintaining such strips at a substantially corrugated orientation during a cooking process, in accordance with the present invention.

Referring initially to FIG. 1, the cooking apparatus of the present invention is referred to generally by reference number 10. Such an apparatus 10 has a unitary design and includes a base or rack 11 having a substantially planar bottom surface 12 and a plurality of edge portions 13 integral therewith and extending upwardly therefrom. A plurality of elongate prongs 15 have lower end portions integral with the rack 11 and extend upwardly therefrom respectively. The plurality of prongs 15 are disposed in a plurality of substantially equally spaced rows for allowing a plurality of bacon strips 18, each having opposed side edge portions 22, 23, to be corrugated in a longitudinal direction by passing through each row of prongs 15, as perhaps best shown in FIG. 7.

The plurality of prongs 15 are provided with a hollow interior so that a plurality of the apparatus 10 can be stacked on top of each other. The plurality of prongs 15 have a substantially square cross-section and an outer surface that converges upwardly for providing a substantially pyramid shape. Of course, other similar shapes may be formed such as a conical prong, for example, and the plurality of prongs 15 may be disposed in a back-to-back relationship to thereby make them more sturdy and decrease the number of prongs in each row, as well know to a person of ordinary skill in the art.

Advantageously, such bacon strips 18 remain detached from each other and are maintained on substantially one respective side edge portion during a cooking process to thereby allow grease to drip downwardly therefrom and towards the base 11. The grease is collected in a plurality of depressions 26 formed in the bottom surface 12 of the base 11. Such depressions 26 are spaced apart from each other and are disposed between the plurality of prong rows.

The plurality of depressions 26 assist to absorb grease and maintain same in a predetermined area. Accordingly, the apparatus 10 is preferably formed from conventional grease-absorbing material such as egg-carton material, for example, as well known in the industry. In addition, the base 11 may include a bottom surface coated with a grease-proof material for preventing grease from passes therethrough.

Figure 2:
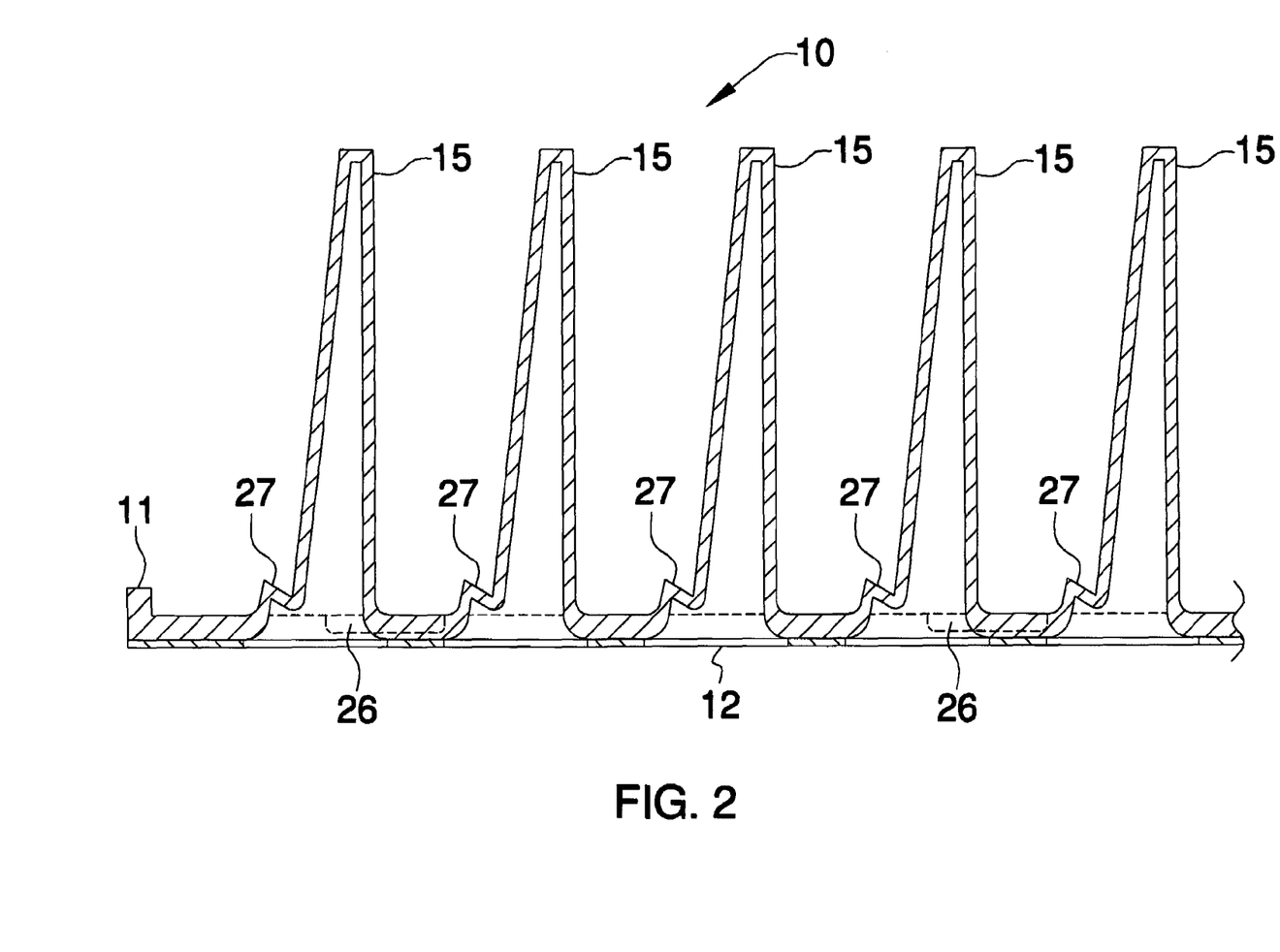
FIG. 2 is an enlarged cross-sectional view taken along line 2—2 in FIG. 1.

Now referring to FIG. 2, the apparatus 10 further includes a plurality of lips 27 integral with the plurality of prongs 15 and extend upwardly from the lower end portions thereof, respectively. Each of the plurality of lips 27 receive one side edge portion of a bacon strip and help maintain same above the base 11 and away from grease collected thereat.

Figure 3:
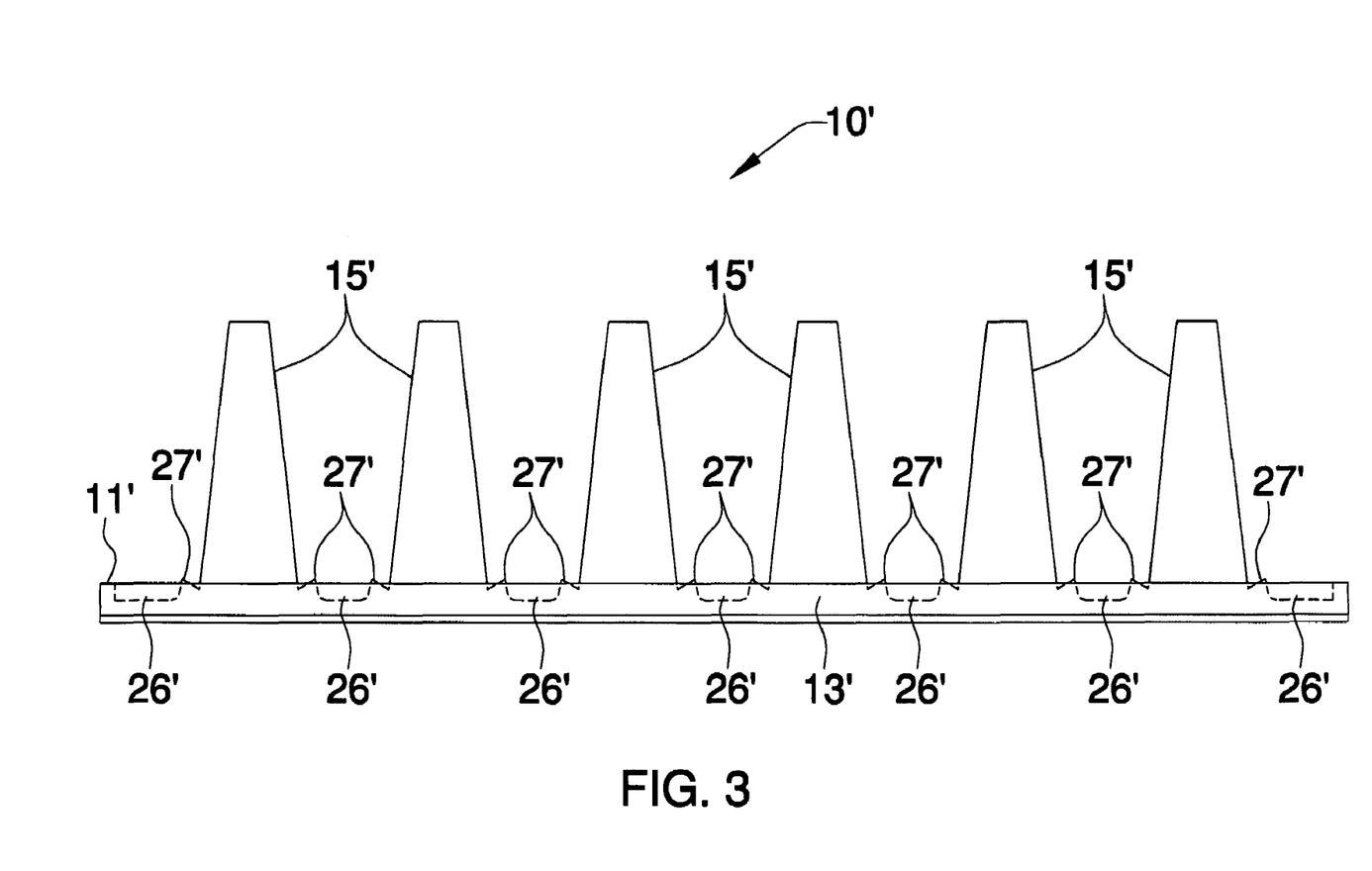
FIG. 3 is an enlarged side elevational view showing an alternate embodiment of FIG. 1.

As perhaps best shown in FIG. 3, an alternate embodiment 10' of the apparatus is shown wherein there are six rows of prongs 15' rather than five rows. Furthermore, each prong 15' includes a pair of lips 27' formed at opposite side thereof and facing adjacent lips of an adjacent prong, as clearly shown. A plurality of depressions 26' are formed between prongs 15' for collecting grease.

Figure 4:
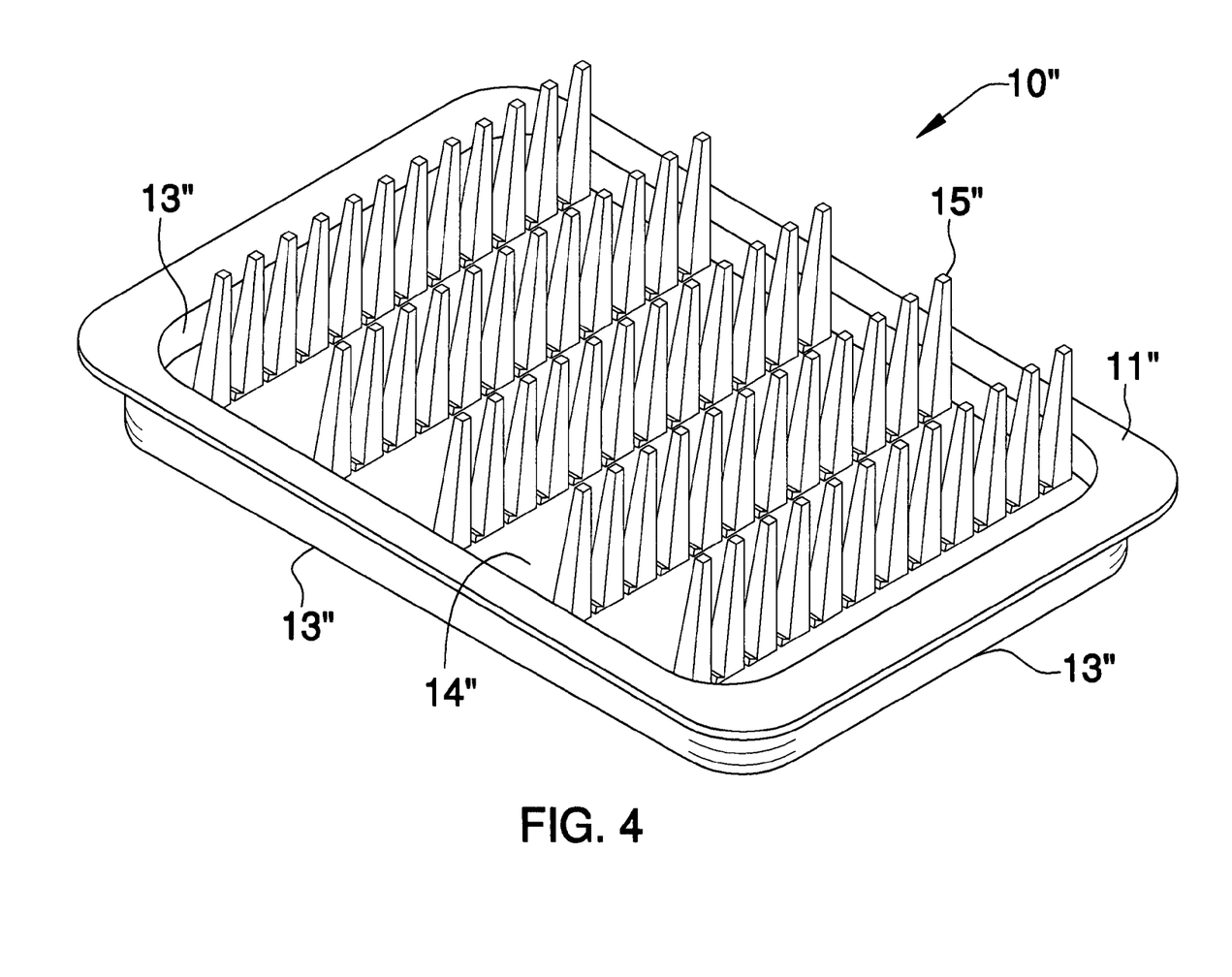
FIG. 4 is a perspective view showing an alternate embodiment of the cooking apparatus shown in FIG. 1.

An alternate embodiment of the present invention is shown is referred to generally in FIG. 4 by the reference numeral 10" and is intended to receive bacon strips and maintain same at substantially corrugated patterns during a cooking process. It should be understood that the cooking apparatus 10' may be used to receive and maintain other eatable items similar to bacon strips.

Figure 5:
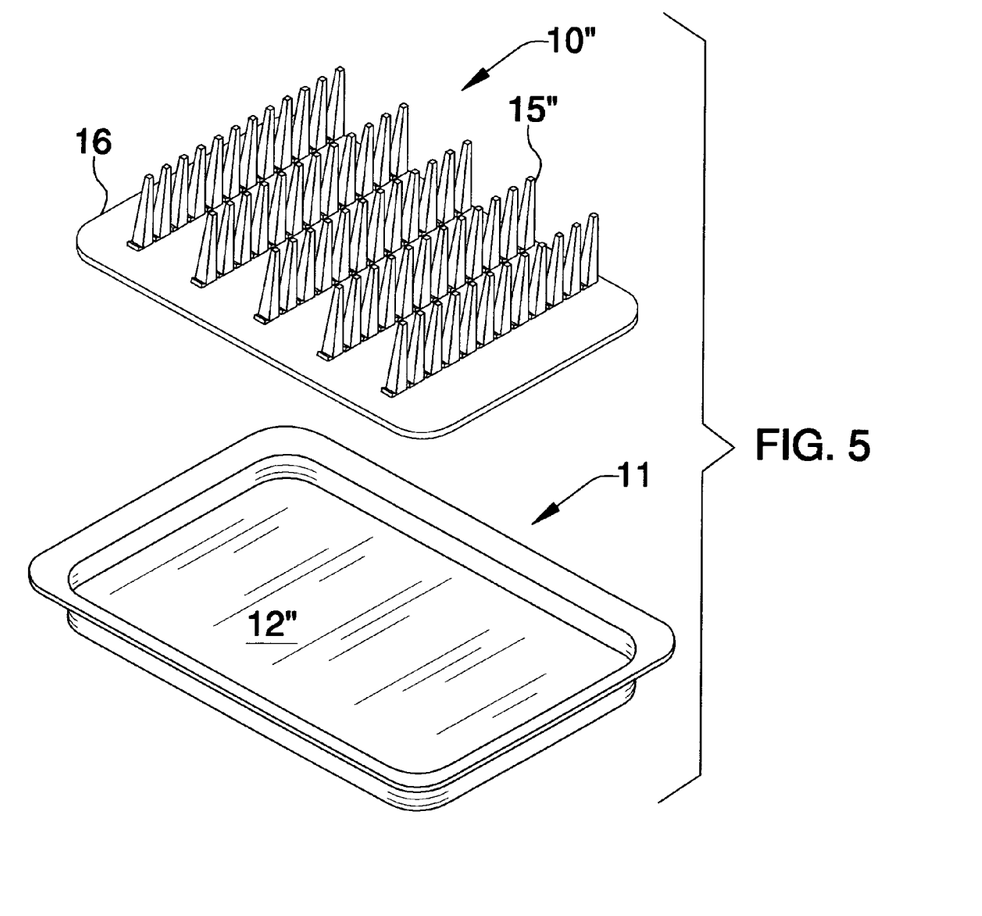
FIG. 5 is an exploded, perspective view of FIG. 4.

Now referring to FIGS. 4 and 5, yet another embodiment 10" is shown and includes a tray 11" having a plurality of edge portions 13" integral with each other and forming a substantially rectangular shape. A base or rack 14" is removably positionable within tray 11" and includes a plurality of elongate prongs 15" generally equally spaced apart and extending upwardly therefrom. The rack 14" further includes a bottom surface 16" wherein the plurality of prongs 15" are attached thereto. The bottom surface 16" extends outwardly from the perimeter of the prongs 15" to absorb grease dripping from bacon strips disposed thereabove and to fit snugly within tray 11" and on the bottom surface 12" thereof.

The outer edge portions 13" of tray 11" extend upwardly and then outwardly at a substantially perpendicular angle for defining a lip so that the user may hold the cooking apparatus 10" therefrom. The tray 11" is preferably made from a durable plastic, or other suitable material, that is microwavable. The rack 14" is preferably made from a disposable material such as paper or other suitable material, as really known in the industry, for absorbing grease dripping from bacon disposed between the plurality of prongs 15".

Figure 6:
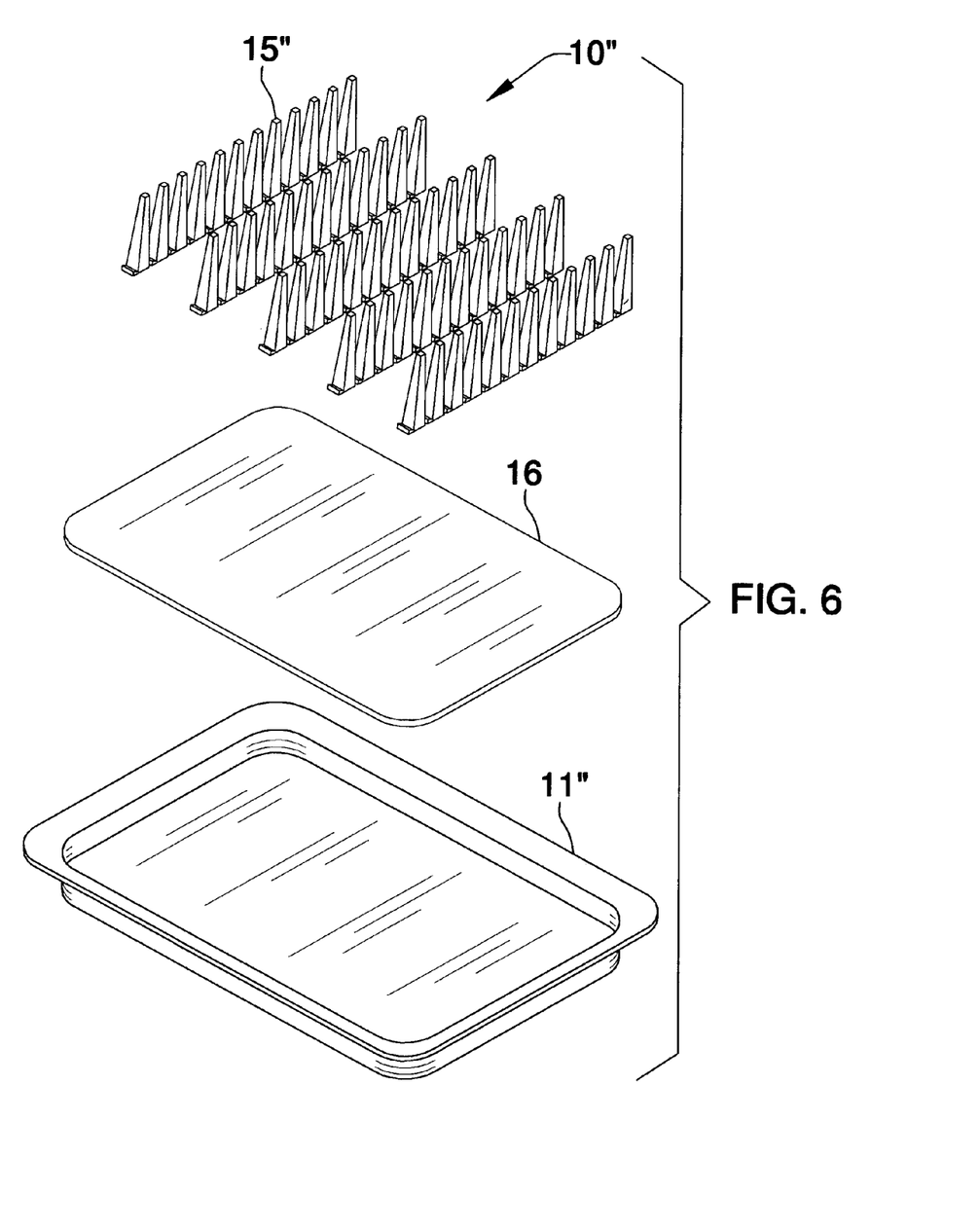
FIG. 6 is a perspective view showing an alternate embodiment of FIG. 4 including a disposable paper layer positionable between a rack and a tray.

Now referring to FIG. 6, the apparatus 10" includes a rack 14" including a base 16" that does not extend outwardly from the perimeter of the prongs 15" and is preferably made from plastic. Such a plastic material should be durable and capable of sustaining microwave-level heat. Further, the base member 16" preferably has opening formed therein for allowing grease to pass therethrough and away from the bacon strips.

The cooking apparatus 10" further includes a paper layer 17" removably positionable between the tray 11" and rack 14" and for absorbing grease that drips thereon so that tray 11" does not need to be routinely cleaned after each cooking process. Of course, paper layer 17" may be formed from various disposable materials which are suitable for its intended application, i.e., able to effectively absorb and retain bacon grease.

Figure 7:
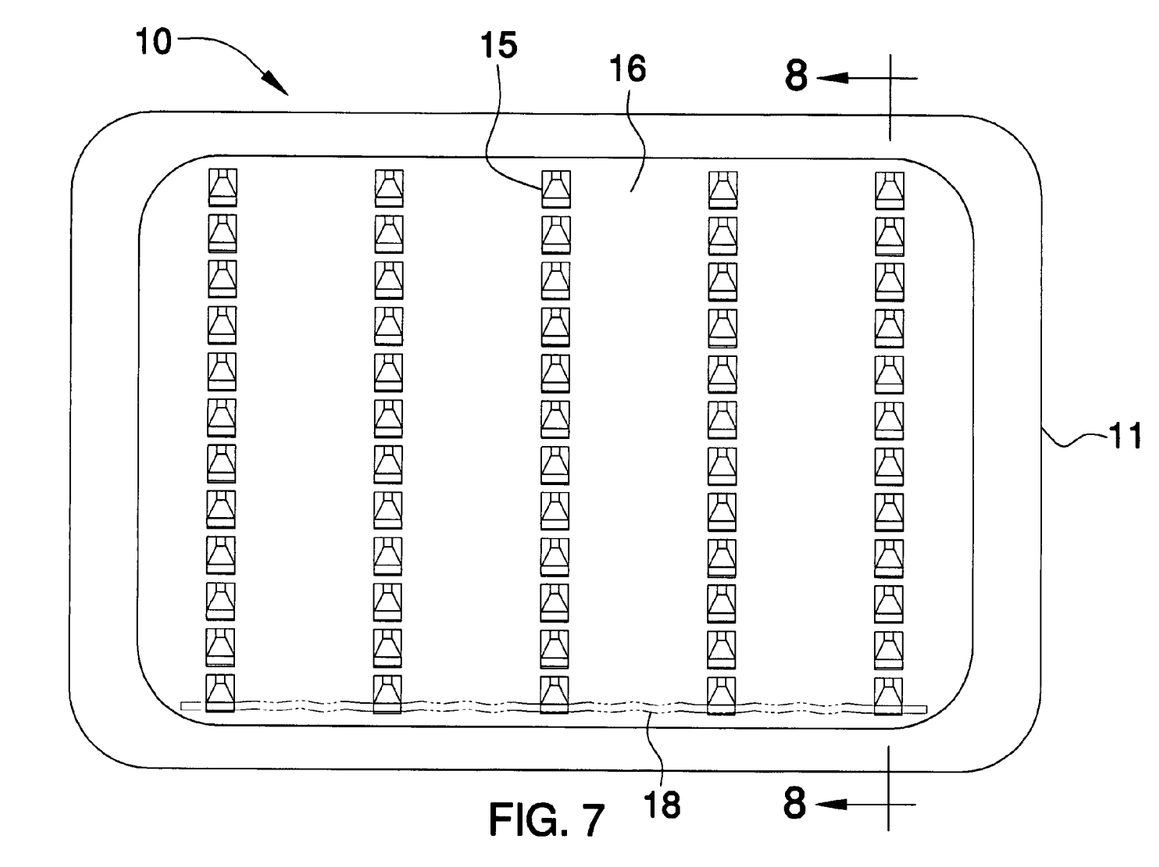
FIG. 7 is an enlarged top plan view of FIG. 4.

Now referring to FIG. 7, it can be seen that bacon strip 18 can be corrugated and maintained between the plurality of prongs 15 so that it can retain its corrugated pattern after a cooking process is complete. Of course, the plurality of prongs 15 may be spaced apart in different intervals so that the cooking apparatus 10 can accommodate various sized bacon strips 18, i.e., the prongs 15 do not have to be substantially equally spaced apart.

Figure 8:
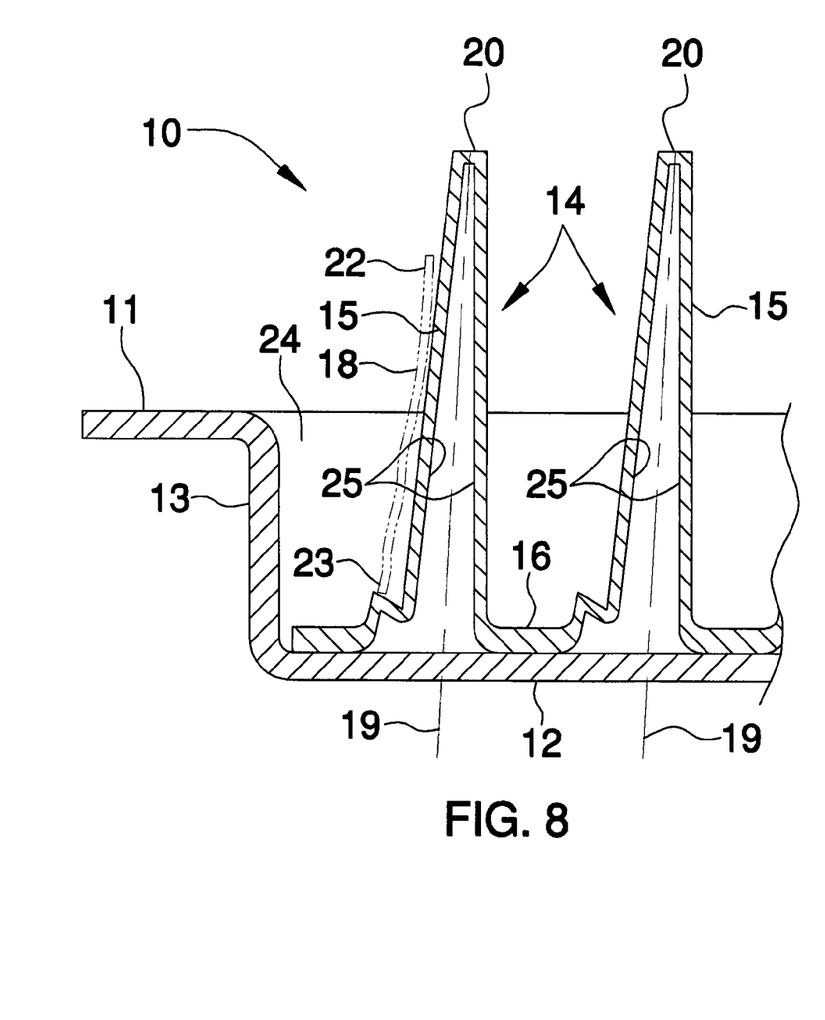
FIG. 8 is an enlarged cross-sectional view taken along line 8—8 in FIG. 7.

Now referring to FIG. 8, a cross-sectional view of the cooking apparatus 10 is shown wherein tray 11 defines a cavity 24 within its outer edge portions 13 and for receiving rack 14 therein. Thus, base 16 of rack 14 is positionable directly on bottom surface 12. Notably, each of the plurality of prongs 15 includes a centrally disposed longitudinal axis 20, which extends upwardly at a non-perpendicular angle from bottom surface 12 of tray 11. Therefore, the plurality of prongs 15 do not extend perpendicularly from the bottom surface 12. Rather, they extend at a beveled angle, as clearly shown.

Each prong 15 has a lower end portion 19 oppositely spaced from an upper end portion 20. The lower end portions 19 have greater widths than the upper end portions 20 and therefore define openings therebetween, which are narrower than corresponding openings between the respective upper end portions 20 of each prong 15. Advantageously, each bacon strip 18 may be corrugated between the plurality of prongs 15 wherein the lower side edge portions 23 of the bacon strips 18 can be maintained between the lower end portions 19 of each prong 15. The upper side edge portions 20 of each bacon strip 18 therefore has more room to be positioned between the upper end portions 20 of each prong 15.

Such a structure helps maintain each bacon strip 18 at a generally stable position during the cooking process so that grease can drip downwardly therefrom and be absorbed by the outer surfaces 25 of each prong 15 and by the base 16 of rack member 14. In particular, the outer surfaces 25 of each prong 15 converge upwardly towards the respective upper end portions 20 to form a generally conical shape, as clearly shown. This helps prevent the bacon strips 18 from drowning in their own grease and also helps prevent same from splattering about in a microwave. After the cooking process is complete, each crisp bacon strip 18 thereby maintains its corrugated shape, as commonly desired by the general public. Furthermore, rack 14 simply can be removed from tray 11 and disposed of without needing to wipe down tray 11 after each use.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. An apparatus for cooking bacon and comprising:
    a base having a bottom surface and a plurality of edge portions integral therewith and extending upwardly therefrom;
    a plurality of elongate prongs having lower end portions integral with said base and extending upwardly therefrom respectively, said plurality of prongs being generally equally spaced apart and for allowing a plurality of bacon strips each having opposed side edge portions to be corrugated therebetween and detached from each other and maintained on substantially one respective side edge portion during a cooking process to thereby allow grease to drip downwardly therefrom and towards said base; and
    a plurality of lips integral with said plurality of prongs and extending upwardly from the lower end portions thereof respectively, each said plurality of lips for receiving said one side edge portion of a bacon strip and for maintaining same above said base and away from grease collected thereat.

2. The apparatus of claim 1, further comprising a plurality of depressions formed on said base and spaced apart between said plurality of edge portions, said plurality of depressions assisting to absorb grease and maintaining same in a predetermined area.

3. The apparatus of claim 1, wherein said base includes a bottom surface coated with a grease-proof material for preventing grease from passes therethrough.

4. The apparatus of claim 1, wherein said plurality of prongs are provided with a hollow interior so that a plurality of said apparatus can be stacked on top of each other.

5. The apparatus of claim 1, wherein said apparatus is formed from grease-absorbing material.

6. An apparatus for cooking bacon and comprising:
    a base having a bottom surface and a plurality of edge portions integral therewith and extending upwardly therefrom;
    a plurality of elongate prongs having lower end portions integral with said base and extending upwardly therefrom respectively, said plurality of prongs being generally equally spaced apart and for allowing a plurality of bacon strips each having opposed side edge portions to be corrugated therebetween and detached from each other and maintained on substantially one respective side edge portion during a cooking process to thereby allow grease to drip downwardly therefrom and towards said base;
    a plurality of lips integral with said plurality of prongs and extending upwardly from the lower end portions thereof respectively, each said plurality of lips for receiving said one side edge portion of a bacon strip and for maintaining same above said base and away from grease collected thereat; and
    a plurality of depressions formed on said base and spaced apart between said plurality of edge portions, said plurality of depressions assisting to absorb grease and maintaining same in a predetermined area.

7. The apparatus of claim 6, wherein said base includes a bottom surface coated with a grease-proof material for preventing grease from passes therethrough.

8. The apparatus of claim 6, wherein said plurality of prongs are provided with a hollow interior so that a plurality of said apparatus can be stacked on top of each other.

9. The apparatus of claim 6, wherein said apparatus is formed from grease-absorbing material.

10. An apparatus for cooking bacon and comprising:
    a tray having a substantially planar bottom surface and a plurality of edge portions integral therewith and extending upwardly therefrom;
    a rack removably positionable on top of said tray and between said plurality of edge portions, said rack including a plurality of elongate prongs having lower end portions connected to said rack and extending upwardly therefrom respectively, said plurality of prongs being generally equally spaced apart and for allowing a plurality of bacon strips each having opposed side edge portions to be corrugated therebetween and detached from each other and maintained on substantially one respective side edge portion during a cooking process to thereby allow grease to drip downwardly therefrom and towards said tray; and a paper layer removably positionable between the bottom surface of said tray and said rack and for absorbing bacon grease;

wherein each said plurality of prongs further has a centrally disposed longitudinal axis positioned at a non-perpendicular angle to said tray.

11. The apparatus of claim 10, wherein each said plurality of prongs further has respective upper end portions having a width that is smaller that a width of each said respective lower end portions.

12. The apparatus of claim 10, wherein each said plurality of prongs further has respective upper end portions spaced further apart from each other than said respective lower end portions.

13. The apparatus of claim 10, wherein each said plurality of prongs further has a substantially conical shape.

14. The apparatus of claim 10, wherein each said plurality of prongs further has an outer surface converging upwardly from respective lower end portions thereof.

15. The apparatus of claim 10, wherein said rack is formed from a disposable material.

16. The apparatus of claim 10, wherein said rack is made from a plastic material.

* * * * *